United States Patent
von Möller

[19]

[11] Patent Number: 6,139,102
[45] Date of Patent: Oct. 31, 2000

[54] BACK SUPPORT FOR SEAT-BACKS, IN PARTICULAR FOR MOTOR VEHICLE SEATS

[75] Inventor: Moritz von Möller, Bielefeld, Germany

[73] Assignee: Megaplast S.A., Amurrio, Spain

[21] Appl. No.: 09/202,163

[22] PCT Filed: Mar. 21, 1998

[86] PCT No.: PCT/EP98/01655

§ 371 Date: May 13, 1999

§ 102(e) Date: May 13, 1999

[87] PCT Pub. No.: WO98/45138

PCT Pub. Date: Oct. 15, 1998

[30] Foreign Application Priority Data

Apr. 10, 1997 [DE] Germany ............... 297 06 397 U

[51] Int. Cl.[7] .................................................. A47C 3/025
[52] U.S. Cl. ................................... 297/284.4; 297/284.1
[58] Field of Search ............................. 297/284.1, 284.4

[56] References Cited

U.S. PATENT DOCUMENTS 4,354,709 10/1982 Schuster .
4,541,670 9/1985 Morgenstern .
4,632,454 12/1986 Naert .
4,722,569 2/1988 Morgenstern .
5,076,643 12/1991 Colassanti .
5,344,211 9/1994 Adat .
5,553,917 9/1996 Adat et al. .

FOREIGN PATENT DOCUMENTS 4405495 5/1996 Germany .
9531918 11/1995 WIPO .

*Primary Examiner*—Milton Nelson, Jr.
*Attorney, Agent, or Firm*—White & Case LLP

[57] ABSTRACT

A lumbar support for seat backs, in particular of motor vehicle seats, has a forward-bowed support plate (1) that is adjustable in its curvature. The support plate (1 is mounted at one horizontal end region (1a) on laterally spaced guide elements that are parallel to one another and fixed with respect to the seat back so that it is vertically movable. The vertical guide elements consist of ribs (2) of a guide plate (3) that is fixed with respect to the seat back. The guide plate (3) has openings (4), which possess vertical guide edges (4a) that are parallel to one another. Through the guide edges (4a) pass, from the front, end-mounted brackets (1b) of the support plate (1). The brackets (1b) have necks (1c) corresponding to the spacing of the guide edges (4a), and widen again on the back of the guide plate (3).

12 Claims, 3 Drawing Sheets

BACK SUPPORT FOR SEAT-BACKS, IN PARTICULAR FOR MOTOR VEHICLE SEATS

TECHNICAL FIELD

The invention concerns a lumbar support for seat backs, in particular of motor vehicle seats.

STATE OF THE ART

In known lumbar supports of this nature, the laterally spaced guide elements are guide wires attached to the seat back, tensioned parallel to one another. The installation of such lumbar supports is resource-intensive.

THE INVENTION

The object of the invention is to design a lumbar support of the type specified as known in such a way that the entire lumbar support can simply be placed in the back rest as a finished component.

This object is accomplished with the features of the novelty portion of claim 1.

Preferred embodiments of the invention are described in the dependent claims.

The lumbar support in accordance with the invention is simple and economical to produce. It permits assembly and also installation in the back rest with comparatively little expense.

BRIEF DESCRIPTION OF THE DRAWING

A preferred embodiment of the invention is described in detail below with the aid of the drawing.

BEST WAY TO IMPLEMENT THE INVENTION

Figure 1:
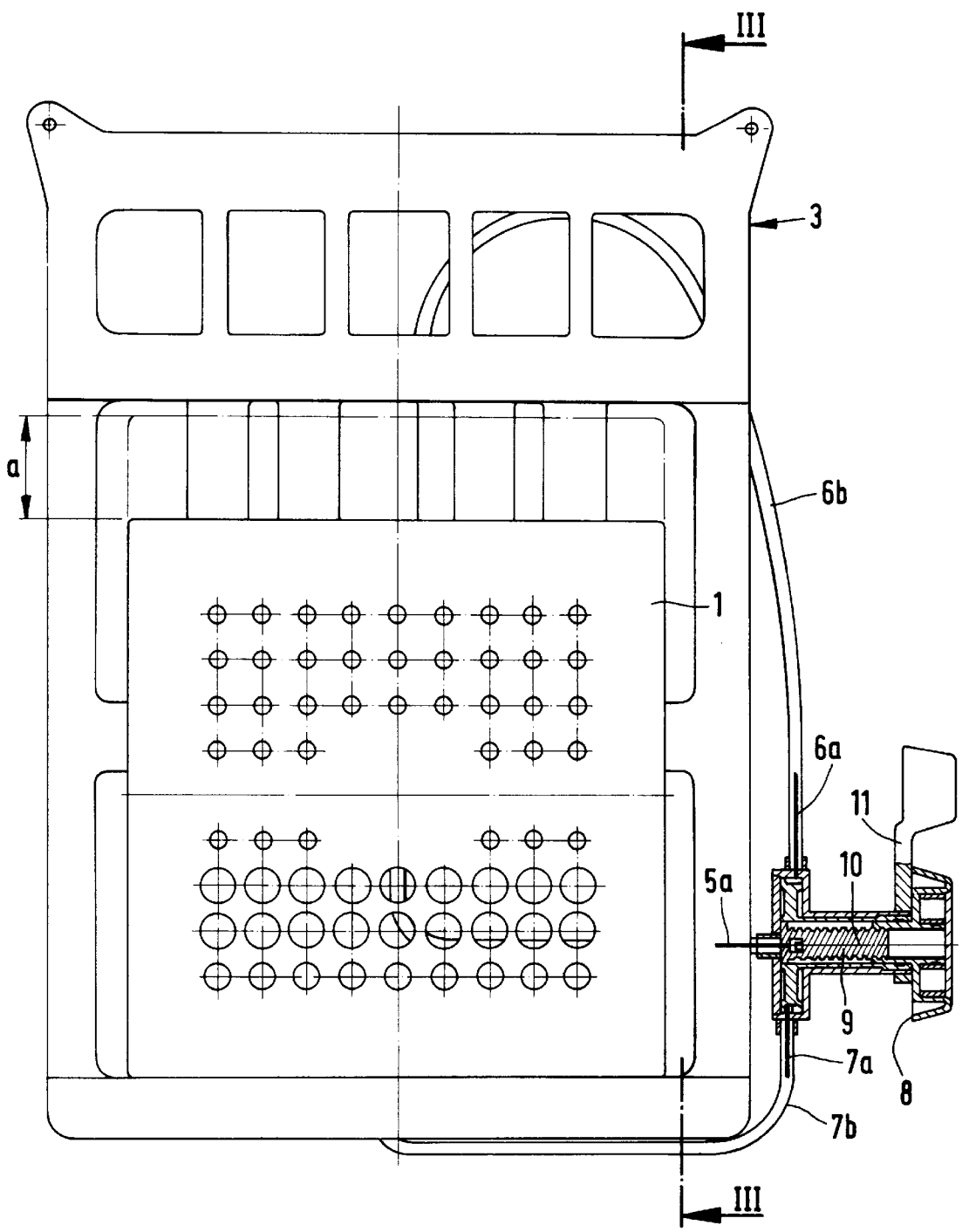
FIG. 1 shows a front view of the lumbar support with a cutaway view of an operating mechanism.
Figure 2:
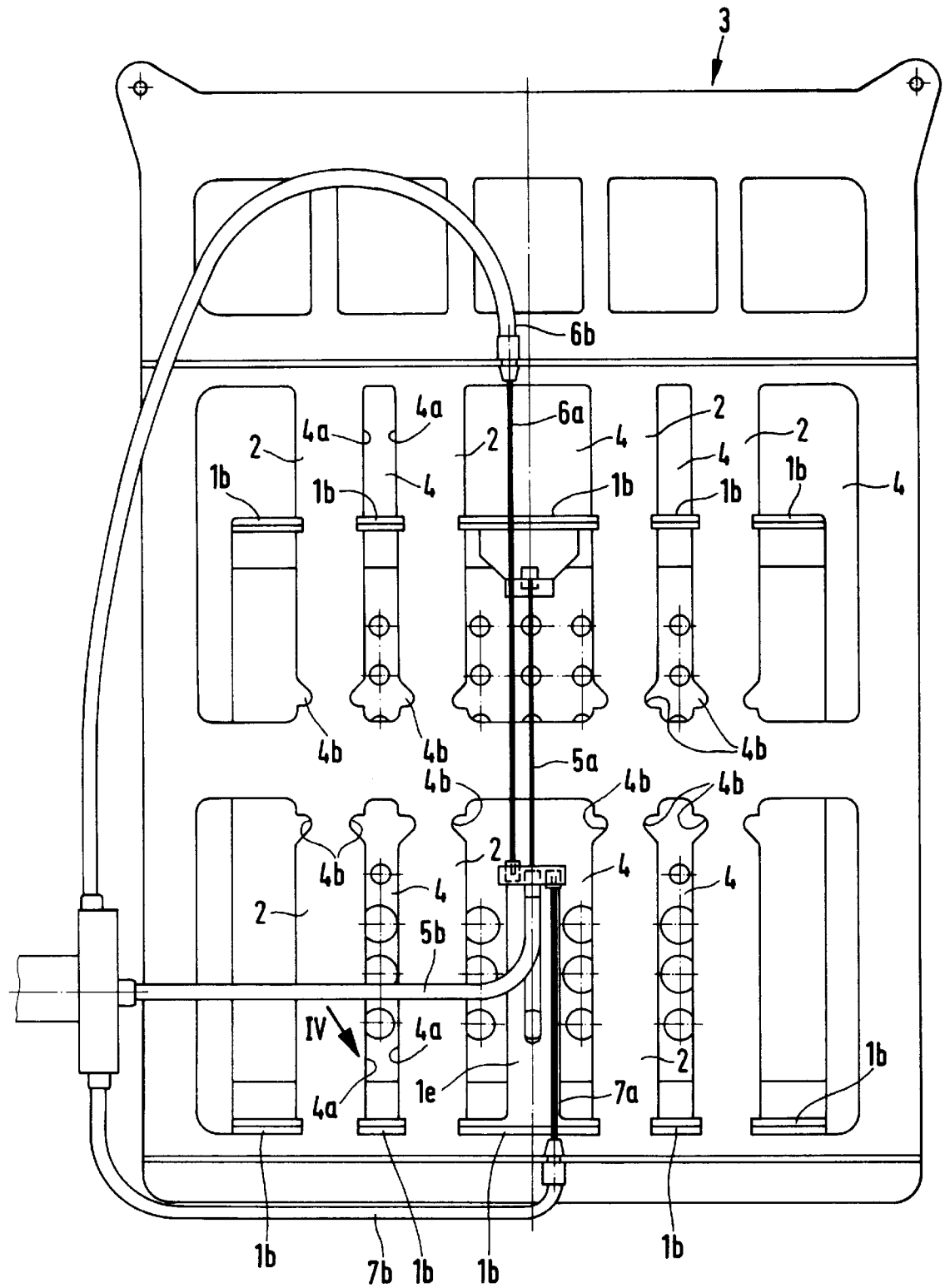
FIG. 2 shows a rear view of the lumbar support from FIG. 1.
Figure 3:
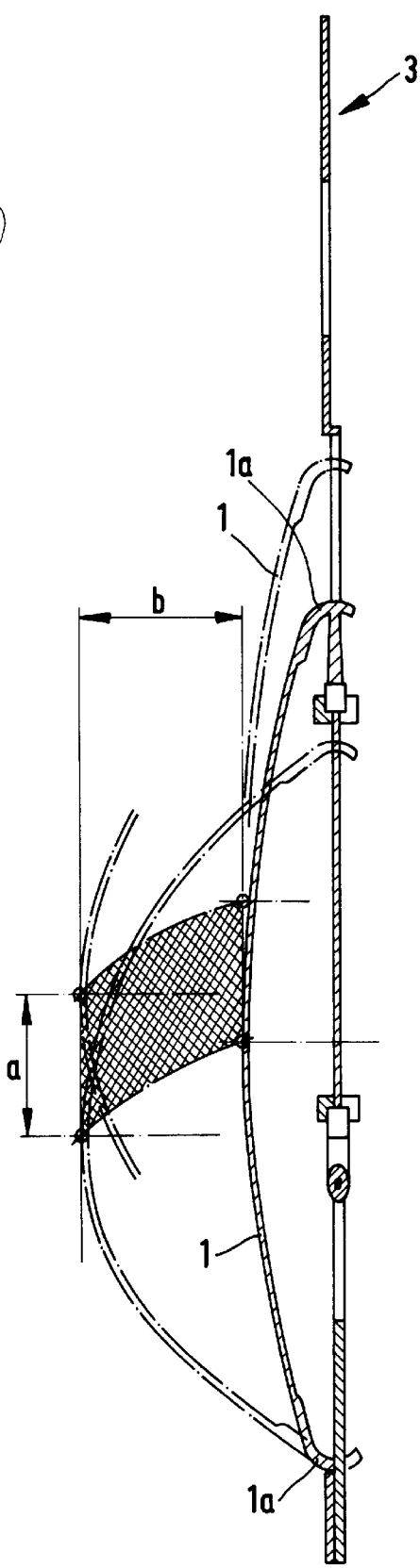
FIG. 3 shows a simplified cross-section as per III—III in FIG. 1.

In the embodiment shown, a support plate 1 is adjustable in its curvature or arch, and also movable with regard to height. The height adjustment path is represented as a in drawing FIGS. 1 and 3. The adjustment depth is given as b in FIG. 3.

The principle upon which the invention is based can also be used in lumbar supports whose support plates are not height-adjustable, but are instead only adjustable with regard to curvature.

Figure 4:
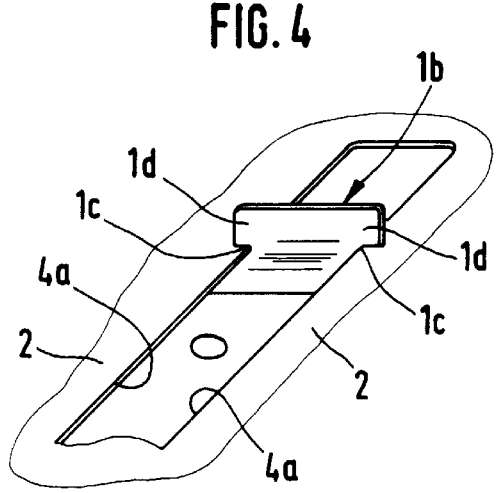
FIG. 4 shows a perspective view of a detail from IV in FIG. 2.

The support plate 1 is carried on vertically extending ribs 2 of a one-piece guide plate 3. Between the ribs 2 are provided openings 4, which have vertical guide edges 4a on their margins. Through the openings 4 pass end-mounted brackets 1b of the support late 1 (se FIG. 4). the rackets 1b have necks 1c, which correspond to the spacing of the guide edges of adjacent ribs 2. On the back of guide plate 3, the brackets 1b have shoulders 1d.

The guide edges 4a have, outside of the guide regions, notches 4b, which are deeper tan the shoulders 1d of the brackets 1b that grip behind the guide edges. As a result of this design, when the support plate is strongly bowed it is possible to insert the brackets in the openings in such a way that the shoulders grip behind the guide edges, and the support plate 1 is thereby carried properly on the guide plate.

The curvature adjustment of the support plate is done by means of a Bowden cable, which consists of a core 5a and a sleeve 5b. One end of the core is attached to the center bracket 1b. One end of the sleeve is attached to a bracket 1e, which in turn is connected to the opposite bracket 1b. The other end of the core 5a is attached to the center of a lead screw 9, which can be moved in the direction of the axis 10 by means of a handwheel 8, which has in its center a female thread region matched to the lead screw 9. By this means, the horizontal upper and lower end regions 1a and 1b of the support plate (se FIG. 3) move closer together or further apart with the result that the curvature can be adjusted hereby, and the depth of the arch changes accordingly.

In the depicted embodiment, it is not just the arch of the support plate 1 that is adjustable, but also the vertical position. Adjustment of the vertical position is achieved with the aid of a pivoting lever 11, mounted coaxially to the lead screw 9, which turns two opposing regions to which are attached the ends of two Bowden cable cores 6a and 7a run in sleeves 6b and 7b. The ends of sleeves 6b and 7b of both Bowden cables that face away form the adjusting mechanism are fixed to the guide plate 3. The ends of sleeves 6a and 7a facing away from the operating mechanism are attached to the support plate 1. In this context, these ends engage with the vertical bracket 1e, to which the sleeve 5b of the Bowden cable for the curvature adjustment is also attached.

What is claimed is:

1. A lumbar support for a seat back, the lumbar support comprising:

a forward-bowed support plate (1) that is adjustable in curvature and is mounted to an vertically movable on a guide plate (3) that is fixed on the seat back, the guide plate having laterally spaced vertical guide elements that are parallel to one another;

the vertical guide elements composed of ribs (2) on the guide plate (3) and openings (4), which possess vertical guide edges (4a) that are parallel to one another; and the support plate (1) having end-mounted brackets (1b) that have necks (1c) corresponding to the spacing of the openings (4) defined by the guide edges (4a), the support plate (1) being disposed in front of the guide plate (3) and the necks (1c) passing through the openings (4) and then widening on the back of the guide plate (3).

2. A lumbar support in accordance with claim 1, wherein the support plate (1) further comprises upper and lower end regions (1a) and both end regions (1a) of the support plate (1) have brackets (1b) that pass through each of the openings and that have necks (1c) corresponding to the spacing of the openings (4) defined by the guide edges (4a) and that have shoulders (1d) on the back of guide plate (3), such that the support plate (1) is mounted on the guide plate (3) so as to be adjustable in height.

3. A lumbar support in accordance with claim 2 wherein the openings (4) have outside of a guide region, notches (4b), which are deeper than the shoulders (1d) of the brackets (1b) that grip behind the guide edges.

4. A lumbar support in accordance with any of claims 1–3, wherein the brackets (1b) are molded in one piece on the support plate (1) and are made of plastic.

5. A lumbar support in accordance with any of claims 1–3, wherein the guide plate (3) is made of plastic.

6. A lumbar support in accordance with any of claims 1–3, wherein the curvature is adjustable by means of a Bowden cable (5a, 5b) having a sleeve (5b) that is permanently attached to one end of the support plate (1) and having a core (5a) that is permanently attached to the other end of the support plate (1).

7. A lumbar support in accordance with claim 6, wherein the sleeve (5b) is permanently attached to the support plate (1) through a vertical bracket (1e) fastened at the appropriate end.

8. A lumbar support in accordance with claim 6, wherein the operation of the Bowden cable (5a, 5b) for curvature adjustment is done by means of a lead screw (9) which is longitudinally movable via a rotatable handwheel (8) and which, when turning, moves an end of a core that faces away from the point of attachment on the support plate in the direction of the axis of rotation (10).

9. A lumbar support in accordance with any of claims 1–3, wherein the support plate (1) is adjustable in height by means of two Bowden cables (6a, 6b; 7a, 7b) that act in opposition.

10. A lumbar support in accordance with claim 9, wherein the adjustment of the two Bowden cables (6a, 6b; 7a, 7b) for height adjustment of the support plate (1) is done by means of a pivoting lever (11) which is mounted coaxially to a lead screw, and which turns two opposing regions to which are attached the ends of the Bowden cable cores (6a; 7a) that face away from the guide plate.

11. A lumbar support in accordance with claim 9; wherein sleeves (6b, 7b) of both Bowden cables are fixed to the guide plate (3), and cores (6a, 7a) to the support plate (1).

12. A lumbar support in accordance with claim 11, wherein the cores (6a, 7a) are fastened to a common vertical bracket (1e) to which is also fastened the sleeve of the Bowden cable for curvature adjustment.

\* \* \* \* \*